Aug. 23, 1938.  F. W. MAAGE ET AL  2,127,876
SEED PLANTER
Filed Oct. 6, 1936  2 Sheets-Sheet 2
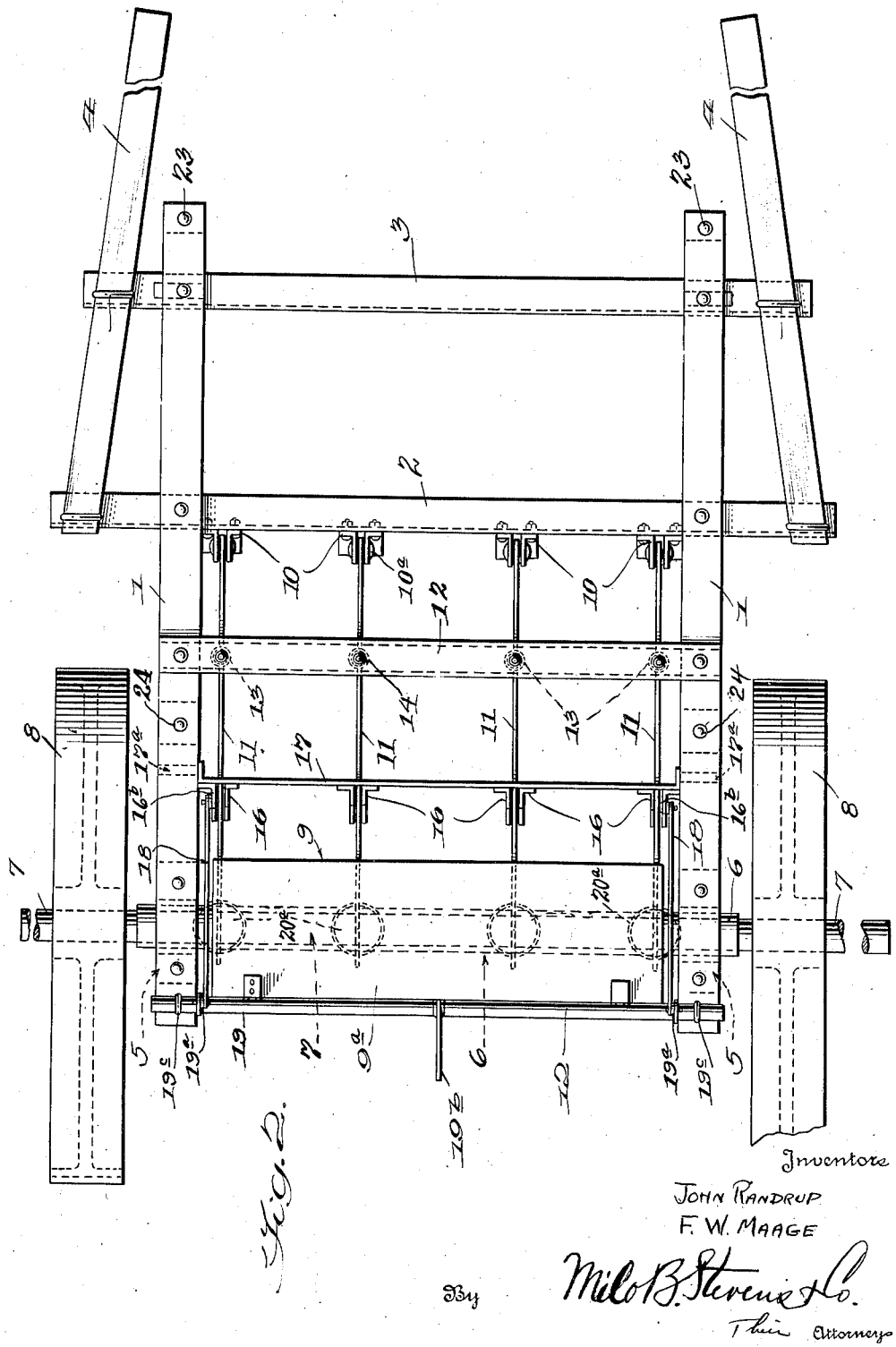
Inventors
JOHN RANDRUP
F. W. MAAGE
By Milo B. Stevens & Co.
Their Attorneys Patented Aug. 23, 1938

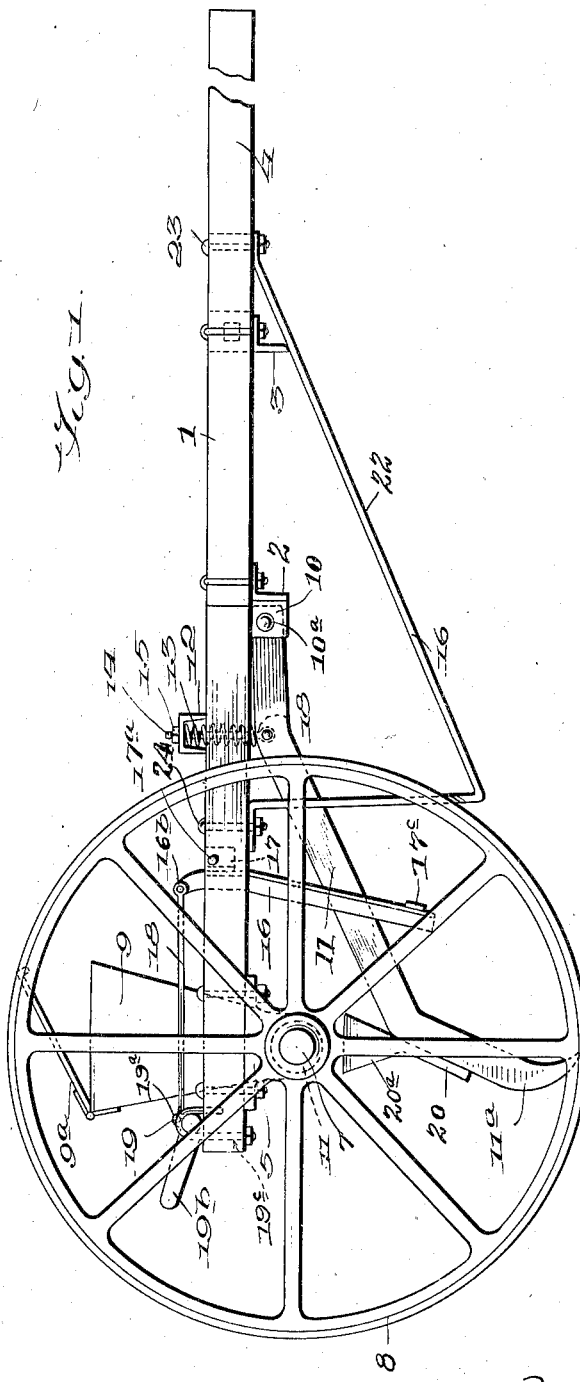

2,127,876

UNITED STATES PATENT OFFICE 2,127,876

SEED PLANTER

Frederick William Maage and John Randrup
Manila, P. I.

Application October 6, 1936, Serial No. 104,288

8 Claims. (Cl. 111—52)

Our invention relates to improvements in seed planters, cultivators and the like.

Briefly stated, the invention has for one of its primary objects the provision of means which will enable a cultivator, a seeder or the like to readily pass over dikes, embankments and the like without undue jolting so as to save the apparatus from unnecessary wear and tear; and also in the case of a seed planter wherein the seed depositing means is operated by the turning of the traction wheels, to prevent the traction wheels and likewise the seed discharge means from operating as the machine ascends a dike or embankment. It is very important that a seeding machine shall not operate when it is ascending a dike or embankment because the ground openers which break the ground for the dropping of the seed would not be in engagement with the ground at such time inasmuch as such openers are usually disposed rearwardly of or at the axis of the wheels.

The invention also contemplates the provision of novel ground opening members for a seeding machine and having seed catching and planting tubes carried thereby, there preferably being means for normally and yieldably urging said ground engaging members into operative position.

The invention also contemplates the provision of a novel seed ejecting means whereby one seed at a time can be planted at one or a plurality of points in the direction of the width of the machine, and such planting is spaced a predetermined distance apart in the direction of travel of the machine.

Other objects and advantages of the invention will be readily understood and appreciated as the description proceeds, reference being had to the accompanying drawings illustrating what is now regarded as the preferred example of the invention. It is to be understood, however, that the preferred form of the invention herein shown and described is susceptible of considerable change and modifications within the spirit and scope of the subject matter claimed hereinafter.

In the drawings, wherein the same reference characters have been used to designate the same parts in all views, Figure 1 is a side elevational view of a combined seeder and cultivator embodying my invention;

Figure 2 is a top plan view thereof;

Figure 3 is a detailed view illustrating the novel seed discharge member and its housing, the same being formed in a manner so as to eject individual seeds at different points in the direction of the width of the machine and to space the seeds a predetermined distance in the direction of travel of the machine.

Figure 4 is a cross sectional view taken on the dotted line 4 of Figure 3 and looking in the direction of the arrow.

Referring to the drawings by reference characters, numeral 1 denotes the side members of a frame having the laterally spaced front cross members 2 and 3 whose ends extend beyond the side members 1 and carry the shafts 4 between which the mule or other draft animal is adapted to be harnessed to a single tree (not shown) carried by the front frame cross bar 3.

The rear ends of the frame side members 1 are provided with the bearings 5 bolted thereto and which bearings carry the sleeve or axle housing 6 through which extends the axle shaft 7, the ends of which are made fast in the hubs of the traction wheels 8 so that when the wheels turn the axle will also turn. As indicated in Figures 1 and 2, the seed box 9 is suitably carried by the side members 1 of the frame and by the sleeve or axle members 6 which provides a closure for the hopper-like bottom of the seed box or hopper 9. The seed box 9 may have the hinged closure 9a which provides a seat for the operator.

The cross members 2 and 3 of the frame are preferably angle bars. Figures 1 and 2 illustrate the cross bar 3 as secured to the bottom surfaces of the side members 1 and as carrying the angle pieces 10 having pivot pins 10a for swingably securing the rear ends of shovel members 11 to the forepart of the frame. The shovel members 11 have ground engaging portions 11a disposed on or rearwardly of the vertical plane of the axle 7.

Figure 1 illustrates that a third cross bar 12 connecting the side members 1 of the frame is of channel construction to provide a seating surface for a plurality of laterally spaced springs 13 whose lower ends rest upon the upper edges of the rear portions of the shovel members 11 and are secured in place by pins 14 hinged to such shovel members 11 and extending upwardly through the channel bar 12 to receive nuts 15. The nuts 15 are tightened so as to draw the upper ends of the springs 13 against cross bar 12 so that they tend to urge the shovel members 11 to bring the ground engaging portions 11a into operative position.

In order to sustain the shovel members 11, 11a against tendency to move laterally, we provide the pairs of angle iron guides 16 shown in Figures 1 and 2 as rigidly carried by the fourth angle bar cross member 17 whose end studs or shaft portions 17a provide a horizontal pivotal connection of such cross bar 17 with the side bars 1 so that said cross bar 17 can be rocked. The upper end of each of endmost guides 16 has upwardly and rearwardly extending lugs 16b. Pivotally connected to each of the lubs 16b are link members 18, one at each side of the frame. The rear ends of the link members 18 are connected to the radial arm 19a of a rock shaft 19 which is secured to side members 1 by U-bolts 19c or the like and controlled by the rearwardly extending handle 19b. When shaft 19 is rocked by handle 19b forwardly as viewed in Figure 1, the shovel guides will be thrown rearwardly so that the cross member 17c which connects all of such shovel guides 16 will engage the respective shovel members 11 at the lower edges thereof to elevate same against the action of the springs 13.

Coming now to the means whereby individual seeds will be ejected from the seed box one at a time toward the ground at predetermined points in the direction of the length of the seed box 9 and spaced predetermined distances in the direction of travel of the machine, it will be noted that Figure 3 illustrates the axle housing or tube 6 as provided with laterally spaced holes 6a at its upper portion, which holes are open to the contents of the seed box or hopper 9. The shaft or axle 7 has an annular series of circumferentially spaced pockets 7a registering with the holes 6a of housing 6. These pockets 7a are of a size to receive an individual seed such as a mango seed which is widely planted in the Philippines and must be planted one at a time and a predetermined distance apart.

The lower side of the axle housing 6 is provided with outlet spouts or holes 6c for the discharge of seed.

In order to insure proper direction of the seed to the furrow made by the digging portion 11a of the shovel, we preferably provide a seed planting tube 20 secured to the rear portion of the digging part 11a of the shovels and which tubes have upwardly and outwardly flared funnel-like mouths 20a for receiving seed from the holes or discharge portions 6c of the axle housing 6.

It will be noted that a group of three spouts 6c discharge into each funnel 20a of the tubes 20. Thus three seeds are planted together at one point in order that the coming up of at least one plant may be assured. The seeds are of a size which require that each seed be seated in a pocket 7a of the axle 7 before the seed can be drawn out of the aperture 6a and under the tube 6.

Inasmuch as the seed from the seed box 9 will be fed out through the outlet portion 6c of the axle housing 6 so long as the wheels 8 are rotating, it is very desirable that the wheels 8 be stopped when the machine is ascending a dike or embankment at which time the digging shovels 11a would be out of engagement with the ground and there would be no furrow to receive the seed dropped from the planting tube 20. We therefore provide the side members 1 of the frame with lift members 22 which, in the present example of the invention, take the form of bars or skids, one bolted to one side member 1 in advance of the seed box and the other bolted in the same position to the other side member 1. The lift members or skids 22 provide a rearwardly inclined portion whose forward end is bolted as at 23 to the members 1 and whose rear portion terminates in an upwardly extending post which is bolted to the members 1 as at 24. Particular attention is directed to the fact that the lift or skid members 22 have their inclined portions terminating immediately adjacent the periphery of the wheel 2 and above the level of the ground. This means that the wheel would be engaged with the ground at the top of the dike or embankment and that as the machine travels down the embankment with the digging portions 11a of the shovel members 11 in engagement with the ground the seed would be planted as before, thus avoiding waste of available ground for reception of the seed and obviating the necessity of hand planting at any place in the field. Particular attention is directed to the fact that the front cross member 3 has a flange extending downwardly and engaging the bars providing the skid members or lift members 22 intermediate the ends of the inclined portions thereof so as to support and sustain same.

What we claim as new is:

1. In a seed planter comprising a frame, a seed box, traction wheels supporting said frame, and seed depositing means operable by the turning of said wheels; the combination of a pair of lineally extending inclined lift members rigidly carried by the frame one at each side thereof forwardly of said wheels, each of said lift members providing a downwardly and rearwardly inclined surface whereby to engage embankments in advance of the wheels and lift the wheels from the ground to stop the same and said seed depositing means from operating as the planter ascends the embankment.

2. In a seed planter comprising a frame, a seed box, traction wheels supporting said frame and seed depositing means including ground engaging shovels positioned no further forward than the vertical plane of the axis of said wheels, said seed depositing means operable by the turning of said wheels; the combination of a pair of lineally extending inclined lift members rigidly carried by the frame one at each side thereof forwardly of said wheels, and each of said lift members providing a downwardly and rearwardly inclined surface whereby to engage embankments in advance of the wheels and lift the wheels from the ground to stop same and said seed depositing means from operating as the planter ascends an embankment with its shovels out of engagement with the ground.

3. In a seed planter comprising a frame, a seed box, traction wheels supporting said frame, and seed depositing means operable by the turning of said wheels; the combination of a pair of lineally extending inclined lift members rigidly carried by the frame one at each side thereof forwardly of said wheels, each of said lift members providing a downwardly and rearwardly inclined surface whereby to engage embankments in advance of the wheels and lift the wheels from the ground to stop the same and said seed depositing means from operating as the planter ascends the embankment, and the rear ends of said lift members terminating adjacent the peripheries of the wheels and above the level of the ground whereby the wheels will engage the top of the embankment and will turn to operate the seed depositing means as the planter moves down the opposite side of the embankment.

4. In a seed planter comprising a frame, a seed box, traction wheels supporting said frame and seed depositing means including ground engaging shovels positioned no further forward than the vertical plane of the axis of said wheels, said seed depositing means being operable by the turning of said wheels; the combination of a pair of lineally extending inclined lift members rigidly carried by the frame one at each side thereof forwardly of said wheels, and each of said lift members providing a downwardly and rearwardly inclined surface whereby to engage embankments in advance of the wheels and lift the wheels from the ground to stop same and said seed depositing means from operating as the planter ascends the embankment with its shovels out of engagement with the ground, and the rear ends of said lift members terminating adjacent the peripheries of the wheels and above the level of the ground whereby the wheels will engage the top of the embankment and will turn to operate the seed depositing means as the planter moves down the opposite side of the embankment at which time the shovels will be operatively engaged with the ground.

5. In a seed planter comprising a frame, a seed box, traction wheels supporting said frame, and seed depositing means operable by the turning of said wheels; the combination of a pair of lineally extending inclined lift members rigidly carried by the frame one at each side thereof forwardly of said wheels, each of said lift members providing a downwardly and rearwardly inclined surface whereby to engage embankments in advance of the wheels and lift the wheels from the ground to stop the same and said seed depositing means from operating as the planter ascends the embankment, a draft connection at the forward end of said frame and including an angle bar providing a downwardly extending flange, and said flange engaging said lift members intermediate the ends thereof whereby to support and sustain the same.

6. In a seed planter comprising a frame, a seed box, traction wheels supporting said frame and seed depositing means including ground engaging shovels rearwardly of the plane of the axis of said wheels, said seed depositing means being operable by the turning of said wheels; the combination of a pair of lineally extending inclined lift members rigidly carried by the frame one at each side thereof forwardly of said wheels, and each of said lift members providing a downwardly and rearwardly inclined surface whereby to engage embankments in advance of the wheels and lift the wheels from the ground to stop same and said seed depositing means from operating as the planter ascends the embankment with its shovels out of engagement with the ground, a draft connection at the forward end of said frame and including an angle bar providing a downwardly extending flange, and said flange engaging said lift members intermediate the ends thereof whereby to support and sustain the same.

7. In a seed planter comprising a frame, a seed box, traction wheels supporting said frame, and seed depositing means operable by the turning of said wheels, the combination of a pair of lineally extending inclined lift members rigidly carried by the frame one at each side thereof forwardly of said wheels, each of said lift members providing a downwardly and rearwardly inclined surface whereby to engage embankments in advance of the wheels and lift the wheels from the ground to stop the same and said seed depositing means from operating as the planter ascends the embankment, and the rear ends of said lift members terminating adjacent the peripheries of the wheels and above the level of the ground whereby the wheels will engage the top of the embankment and will turn to operate the seed depositing means as the planter moves down the opposite side of the embankment, a draft connection at the forward end of said frame and including an angle bar providing a downwardly extending flange, and said flange engaging said lift members intermediate the ends thereof whereby to support and sustain the same.

8. In a seed planter comprising a frame, a seed box, traction wheels supporting said frame and seed depositing means including ground engaging shovels rearwardly of the plane of the axis of said wheels, said seed depositing means being operable by the turning of said wheels; the combination of a pair of lineally extending inclined lift members rigidly carried by the frame one at each side thereof forwardly of said wheels, and each of said lift members providing a downwardly and rearwardly inclined surface whereby to engage embankments in advance of the wheels and lift the wheels from the ground to stop same and said seed depositing means from operating as the planter ascends the embankment with its shovels out of engagement with the ground, the rear ends of said lift members terminating adjacent the peripheries of the wheels and above the level of the ground whereby the wheels will engage the top of the embankment and will turn to operate the seed depositing means as the planter moves down the opposite side of the embankment at which time the shovels will be operatively engaged with the ground, a draft connection at the forward end of said frame and including an angle bar providing a downwardly extending flange, and said flange engaging said lift members intermediate the ends thereof whereby to support and sustain the same.

FREDERICK WILLIAM MAAGE.
JOHN RANDRUP.